United States Patent [19]

Frederickson et al.

[11] Patent Number: 4,586,740

[45] Date of Patent: May 6, 1986

[54] LATCH ASSEMBLY

[75] Inventors: James R. Frederickson; William H. Harper, both of Richland; Raymond Perez, Lynnwood, all of Wash.

[73] Assignee: The United States of America as represented by the United States Department of Energy, Washington, D.C.

[21] Appl. No.: 641,547

[22] Filed: Aug. 17, 1984

[51] Int. Cl.[4] ............................................. A47F 13/06
[52] U.S. Cl. .................................. 294/1.1; 294/86.28; 294/906
[58] Field of Search ............. 294/1.1, 906, 902, 86.28, 294/86.17, 86.33, 86.29, 86.2, 86.21, 86.17, 94, 95, 116; 376/230, 233, 260, 268

[56] References Cited

U.S. PATENT DOCUMENTS 4,518,559  5/1985  Fischer et al. ...................... 294/906

FOREIGN PATENT DOCUMENTS 980978  1/1965  United Kingdom ................ 294/906

*Primary Examiner*—James B. Marbert
*Attorney, Agent, or Firm*—Edward W. Nypaver; Robert Southworth, III; Judson R. Hightower

[57] ABSTRACT

A latch assembly for releasably securing an article in the form of a canister within a container housing. The assembly includes a cam pivotally mounted on the housing wall and biased into the housing interior. The cam is urged into a disabled position by the canister as it enters the housing and a latch release plate maintains the cam disabled when the canister is properly seated in the housing. Upon displacement of the release plate, the cam snaps into latching engagement against the canister for securing the same within the housing.

6 Claims, 3 Drawing Figures

LATCH ASSEMBLY

BACKGROUND OF THE INVENTION

This invention relates generally to the material handling art and, more particularly, to a new and improved latch arrangement for securing an article within a housing. The U.S. Government has rights in this invention pursuant to Contract No. DE-ACO6-76FF02170 between the U.S. Department of Energy and the Westinghouse Electric Corporation.

In the nuclear fuel fabrication art, different radioactive powders often must be blended to form the nuclear fuel mixture which is then further processed and ultimately formed into pellets contained within a tubular housing or cladding constituting a nuclear fuel pin. Generally, the blending process is effected by introducing the different powders into a common canister and placing the latter into a housing forming a part of a mixing apparatus which is then operative to set the housing in motion to agitate and mix the powders sufficiently for thorough blending thereof. The placement and removal of the canister into and from the mixing receptacle, as well as locking or latching the canister within the receptacle for movement therewith, customarily has been a manual operation. However, some present and future nuclear fuels utilize ceramic fuel components which are too radioactive for manual handling and must be processed remotely, preferably by robotics. In order to perform these handling functions remotely, it can be appreciated that a need exists for an automatic mechanical interlock arrangement positively securing the canister to the mixing apparatus during blending and which can be readily disabled for removal of the canister after the blending operation.

Accordingly, it is a primary object of the present invention to provide a new and improved latch arrangement for container or housing parts which possesses excellent self-latching action and securing characteristics.

It is another object of this invention to provide a latch construction forming a part of a housing and having positive mechanical interlocking engagement with the article to be secured therein.

It is a further objective of the present invention to provide in combination with a latching device a release actuator forming part of the material handling apparatus.

The foregoing and other objects, advantages, and characterizing features of this invention will become clearly apparent from the ensuing detailed description of an illustrative embodiment thereof, taken together with the accompanying drawings wherein like reference numerals denote like parts throughout the various views.

SUMMARY OF THE INVENTION

A latch assembly for releasably securing an article in a container housing. The latch assembly comprises a cam pivotally mounted on the housing and is normally biased into the interior of the housing. The cam is urged out of the way by the leading end of the article as it enters the housing and thereafter returns under the influence of the bias into latching engagement against the article when properly seated in the housing.

BRIEF DESCRIPTION OF THE DRAWING FIGURES

DETAILED DESCRIPTION OF THE PREFERRED EMBODIMENT

Figure 1:
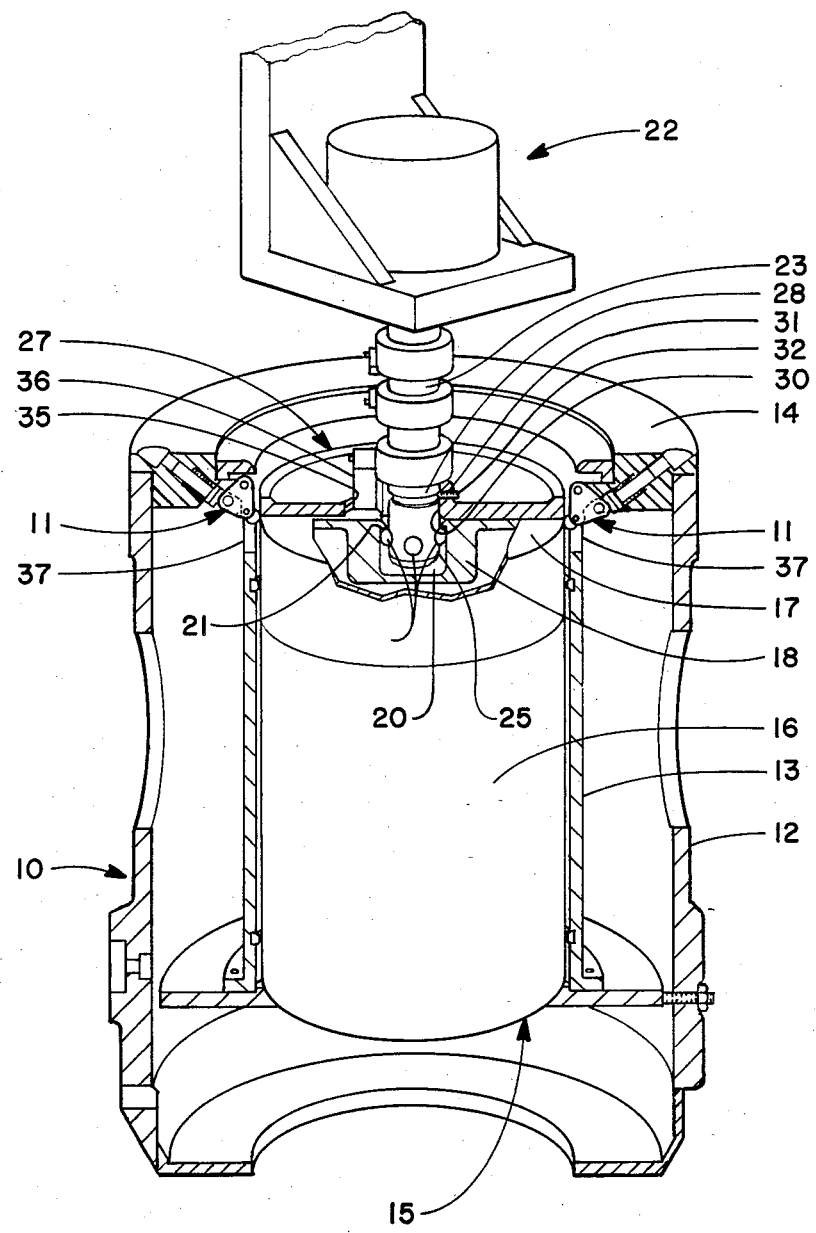
FIG. 1 is a perspective sectional view, with parts broken away, of a blending apparatus embodying the novel features of this invention.

Referring now in detail to the illustrative embodiment depicted in the accompanying drawings, there is shown in FIG. 1 a mixing or blending apparatus, comprehensively designated 10, incorporating a plurality of latch assemblies, generally designated 11, constructed in accordance with this invention and which will hereinafter be more fully described. The blending apparatus 10 comprises an outer housing 12 and an inner housing 13 fixedly and concentrically mounted within outer housing 12 for movement therewith. The inner housing 13 is provided with a specially configurated outturned flange 14 extending between the upper ends of inner and outer housings 13 and 12. Means (not shown) are operatively connected to the housing 12 for gyrating or otherwise moving the same in an irregular tortuous path to agitate and mix materials housed therewithin.

The inner housing 13 is adapted to snugly receive an article in the form of a canister 15 containing the material to be mixed. In this specific application, canister 15 contains different radioactive ceramic and organic powders, such as plutonium and uranium oxides for example, adapted to be blended into a suitable nuclear fuel mixture for ultimate formation into small, cylindrical nuclear fuel pellets. The canister 15 has a cylindrical body 16 sealed closed at the top by a lid 17 which is provided with a central thickened portion 18 formed with a socket 20. An annular shoulder 21 is formed at the open end of socket 20 for co-action with suitable grappling or handling means to facilitate insertion and removal of the canister 15 into and from the inner housing 13.

The article handling apparatus comprises a conventional robot manipulator 22 for remotely handling the canister 15, including inserting and removing the same into and from inner housing 13. The manipulator 22 is formed with a downwardly extending arm 23 having an end portion 25 adapated to be inserted within the canister socket 20. This end portion 25 is provided with a series of circumferentially spaced balls 26 movable radially outwardly and inwardly through their respective openings into engagement and disengagement behind shoulder 21. The means for actuating balls 26 is a known component of the internal mechanism of the manipulator 22 and, per se, forms no part of this invention.

The manipulator arm 23 is provided with a novel latch release plate 27 for movement therewith and is adapted to maintain the several latch assemblies 11 in a disabled, out-of-the-way position, as will herinafter be described. The plate 27 is generally circular in plan and has a diameter approximating the diameter of canister 15, fitting within inner housing 13 with a relatively close tolerance. The plate 27 is formed with a central hub 28 having an opening 30 therethrough for receiving the arm end portion 25. A series of tapped openings 31, preferably three, are formed in the wall of the hub 28 at equally spaced circumferential distances to receive set screws 32 adapted to seat within an annular grove 33 formed in the arm end portion 25. Thus, the release plate 27 is detachably secured to the manipulator arm 23. The plate 27 also is formed with an opening 35 adjacent hub 28 to accommodate a downwardly extending component 36 attached to the manipulator arm 23.

The several latch assemblies 11 are accommodated in suitable rectangularly shaped openings or slots 37 formed at the upper end of the inner housing 13. While preferably four latch assemblies 11 and associated openings 37 are employed in the illustrative embodiment of this invention, it should be understood that more or less than four such latch assemblies can be utilized, if desired, within the purview of this invention. These latch assemblies 11 are mounted on the wall of inner housing 13 in a common plane extending transversely thereof in an equally circumferentially spaced distance thereabout.

Figure 2:
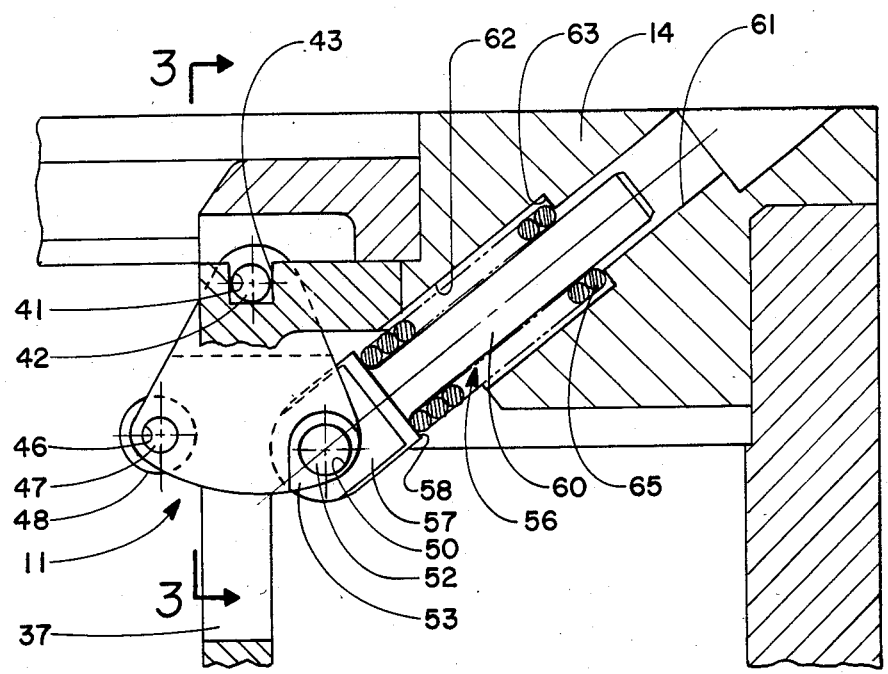
FIG. 2 is a fragmentary, vertical sectional view, showing a latch assembly constructed in accordance with this invention.
Figure 3:
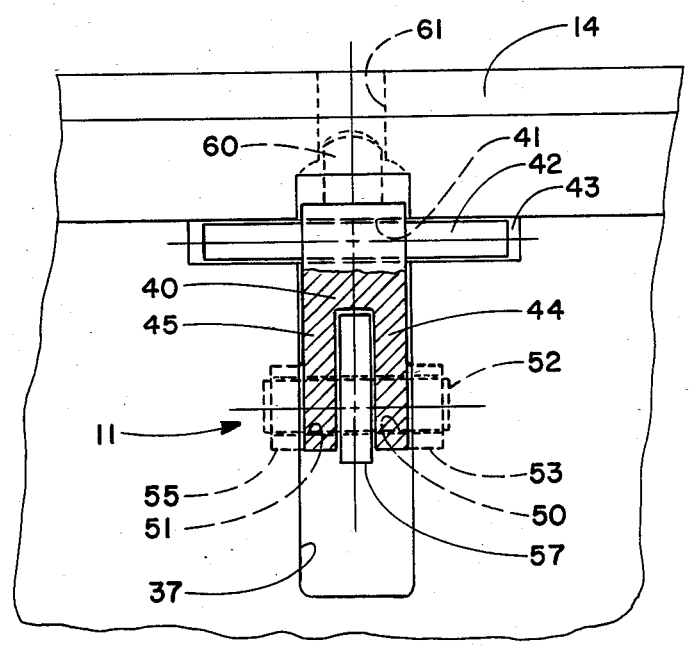
FIG. 3 is a vertical sectional view, taken along line 3—3 of FIG. 2.

As best shown in FIGS. 2 and 3, each latch assembly 11 comprises a latching or locking cam 40 of generally triangular shape in side elevation (FIG. 2) and formed with a transverse bore 41 adjacent its upper end for receiving a pivot pin 42 supported at its opposite ends in a cavity 43 formed in the flange 14 of inner housing 13. The lower portion of cam 40 is bifurcated to form a pair of downwardly extending legs 44 and 45 (FIG. 3). As used herein, the terms upper, lower, vertical, horizontal and the like are applied only for convenience of description with reference to the drawings and should not be taken as limiting the scope of this invention.

A first pair of aligned transverse openings 46 (only one of which is shown in FIG. 2) are formed in legs 44 and 45 adjacent, one or the forward, corner thereof for receiving a pin 47 supporting a roller 48 between the legs and engageable with the release plate 27 and/or canister 15. A second pair of aligned transverse openings 50 and 51 also are formed in legs 44 and 45 adjacent the other or rear corner thereof for receiving a pin 52 journaled for rotation in a pair of bearings or lugs 53 and 55 formed integral with the outer side of legs 44 and 45, respectively.

Means are provided for biasing the cam 40 inwardly into the interior of housing 13. Such means include a piston 56 having a head 57 mounted on the pin 52 between legs 44 and 45. The piston 57 is formed with an integral shoulder 58 and a shank 60 extending axially away from the head 57. The shank 60 is received in a bore 61 extending through the inner housing flange 14 at an angle of about 45° relative to a true horizontal. The bore 61 is counterbored, as at 62, forming a shoulder 63 at the transition between bore 61 and counterbore 62. A helical compression spring 65 is retained in the counterbore 62 about the shank 60 and bears against the shoulder 58 for biasing the piston 56 and thereby cam 40 about the pivot pin 42 in a counterclockwise direction as viewed in FIG. 2. Thus, the cam 40 is continuously urged inwardly into the interior of the inner housing 13.

With the blending apparatus 10 empty, the several cams 40 normally project radially inwardly of the inner housing wall under the influence of the spring bias. When lowering a canister 15 into apparatus 10 by manipulator 22, the canister bottom wall engages the rollers 48, forcing the cams 40 outwardly against the spring bias into their respective slots 37 within the housing wall, allowing the canister 15 to pass thereby into its final seated position within inner housing 13. The cams 40 are maintained retracted by virtue of the release plate 27, which was lowered along with the canister 15.

After the balls 26 are retracted to release the canister 15, the manipulator arm 23 is raised, carrying therewith the release plate 27. As the plate 27 is elevated, the cams 40 snap inwardly under the influence of the spring bias into latching engagement against the top of canister 15, providing a mechanical interlock therewith to prevent the removal of canister 15 from housing 13. The cams 40 latch and secure canister 15 in place within the blending apparatus 10 for movement therewith. After the mixing operation, the manipulator arm 23 is lowered for inserting the end portion 25 thereof into the socket 20 and the balls 26 are displaced outwardly for engagement behind the shoulder 21. As the arm 23 is lowered, the release plate 27 engages the rollers 48 to swing the cams 40 outwardly into their disabled or out-of-the-way positions, allowing canister 15 to be lifted out of the housing 13.

It should be appreciated that the latch arrangement of this invention is not restricted in use for securing a canister in place within a blending apparatus, but has utility in any application where it is desired to firmly latch an article within any type of housing or structure. While the release plate 22 has been conveniently described in association with a manipulator of a remote handling apparatus, it should be understood that such plate in not necessarily employed therewith but can be handled manually or in connection with other apparatus within the purview of this invention.

From the foregoing, it is apparent that the objects of the present invention have been fully accomplished. As a result of this invention, there is provided a novel latching arrangement forming a part of a housing for securing an article therein and maintaining the same in a snug, tightened relation preventing relative movement or play between the article and the housing. The latching assemblies offer improved self-latching action especially suited to remote handling apparatus and coact with means on the remote handling apparatus for disabling the latch assemblies when desired to remove the article from the housing.

The foregoing description of a preferred embodiment of this invention has been presented for purposes of illustration and description only. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A latch assembly for releasably securing an article in an apparatus housing having a side wall and a bottom wall comprising: a latching cam mounted on said housing wall for pivoted movement between an operative position and an inoperative position wherein said cam is triangular in side elevation and formed with a first portion of solid thickness and a second bifurcated portion defining laterally spaced legs, means biasing said cam into said operative position projecting into the interior of said housing, said cam urged into said inoperative position by said article upon entry thereof into said housing, means maintaining said cam in said inoperative position upon passage of said article therepast into a final position seated on the housing bottom wall, said biasing means snapping said cam into latching engagement against said article upon displacement of said maintaining means relative to said cam to secure said article in place against said housing bottom wall and including a pivot pin mounted on said housing wall and extending through said cam first portion, means on said second portion for supporting a roller between said legs, and means on said second portion spaced from said supporting means for mounting a spring biased piston thereon.

2. A latch assembly according to claim 1, wherein said biasing means comprises a piston connected to said cam and spring means urging said piston in a direction pivoting said cam into said operative position into the interior of said housing.

3. A latch assembly according to claim 1, including a roller mounted on said cam for engagement against said article.

4. A latch assembly according to claim 1, in combination with an article handling apparatus for inserting and removing said article into and from said housing, said maintaining means mounted on said article handling apparatus.

5. The combination according to claim 4, wherein said maintaining means comprises a plate having a peripheral surface engagable with said cam.

6. A plurality of latch assemblies according to claim 1, and means mounting said latch assemblies on said housing wall in a common plane extending transversely of said housing in a circumferentially spaced array thereabout, said latch assemblies operable in unison into latching engagement against said article.

* * * * *